United States Patent
Tanaka et al.

(10) Patent No.: US 11,118,597 B2
(45) Date of Patent: Sep. 14, 2021

(54) FAN AND INDOOR UNIT OF AIR-CONDITIONING APPARATUS PROVIDED WITH FAN

(71) Applicant: Mitsubishi Electric Corporation, Tokyo (JP)

(72) Inventors: Kenyu Tanaka, Tokyo (JP); Masahiko Takagi, Tokyo (JP); Megumi Sawai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 119 days.

(21) Appl. No.: 16/617,694

(22) PCT Filed: Jul. 31, 2017

(86) PCT No.: PCT/JP2017/027595
§ 371 (c)(1),
(2) Date: Nov. 27, 2019

(87) PCT Pub. No.: WO2019/026097
PCT Pub. Date: Feb. 7, 2019

(65) Prior Publication Data
US 2020/0116157 A1    Apr. 16, 2020

(51) Int. Cl.
*F04D 29/26*        (2006.01)
*F24F 1/0047*       (2019.01)
(Continued)

(52) U.S. Cl.
CPC ......... *F04D 29/263* (2013.01); *F04D 29/281* (2013.01); *F04D 29/4226* (2013.01);
(Continued)

(58) Field of Classification Search
CPC .. F04D 29/263; F04D 29/281; F04D 29/4226; F04D 29/626; F05D 2260/30;
(Continued)

(56) References Cited

U.S. PATENT DOCUMENTS 4,257,744 A * 3/1981 Watson ................. F04D 29/266
                                                  403/282
6,893,212 B2 * 5/2005 Galassi ................ F04D 29/263
                                                  415/121.1
(Continued)

FOREIGN PATENT DOCUMENTS

JP    S61-005399 U    1/1986
JP    S62-297522 A    12/1987
(Continued)

OTHER PUBLICATIONS

International Search Report of the International Searching Authority dated Sep. 19, 2017 for the corresponding international application No. PCT/JP2017/027595 (and English translation).
(Continued)

*Primary Examiner* — Ninh H. Nguyen
(74) *Attorney, Agent, or Firm* — Posz Law Group, PLC

(57) ABSTRACT

A fan according to the invention is a fan including a motor, a rotating shaft for transmitting rotation of the motor, and a boss part through which the rotating shaft is inserted at a rotation center. A distal end portion of the rotating shaft protrudes from the boss part, the distal end portion is inserted through a center hole of a washer, and is screwed with a fastening part, and the washer includes a washer bearing surface portion that is fastened by being sandwiched between the fastening part and an end surface of the boss part, and a washer outer peripheral portion surrounding an outer periphery of the washer bearing surface portion. The washer bearing surface portion and the washer outer peripheral portion are integrated with each other.

9 Claims, 5 Drawing Sheets

(51) Int. Cl.
*F04D 29/42* (2006.01)
*F04D 29/62* (2006.01)
*F24F 1/0022* (2019.01)
*F04D 29/28* (2006.01)
*F16B 43/00* (2006.01)

(52) U.S. Cl.
CPC .......... *F04D 29/626* (2013.01); *F16B 43/001* (2013.01); *F24F 1/0022* (2013.01); *F24F 1/0047* (2019.02); *F05D 2260/30* (2013.01)

(58) Field of Classification Search
CPC .... F05D 2260/31; F16B 43/00; F16B 43/001; F16B 43/003

See application file for complete search history.

(56) References Cited

U.S. PATENT DOCUMENTS 8,292,577 B2 * 10/2012 Burias .................. F04D 29/263
    415/206
9,214,840 B2 * 12/2015 Kojima ................. F04D 29/646

FOREIGN PATENT DOCUMENTS

| JP | H07-103193 A | 4/1995 |
| JP | H11-062891 A | 3/1999 |
| JP | 2002-276594 A | 9/2002 |
| JP | 2008-101533 A | 5/2008 |
| JP | 2010-101288 A | 5/2010 |

OTHER PUBLICATIONS

Extended European Search Report dated Sep. 10, 2019 issued in corresponding EP patent application No. 17885438.6.

* cited by examiner

FAN AND INDOOR UNIT OF AIR-CONDITIONING APPARATUS PROVIDED WITH FAN

CROSS REFERENCE TO RELATED APPLICATION

This application is a U.S. national stage application of PCT/JP2017/027595 filed on Jul. 31, 2017, the contents of which are incorporated herein by reference.

TECHNICAL FIELD

The present invention relates to a fan and an indoor unit of an air-conditioning apparatus provided with the fan, and more particularly, to a structure of a part where the fan is attached to a motor.

BACKGROUND ART

For example, with an air-conditioning apparatus or other devices, an indoor unit installed on an indoor side includes a fan for sending air into a room. The fan sends air by being driven and rotated by a motor.

With a turbofan and an air-conditioning apparatus provided with the same disclosed in Patent Literature 1, a rotating shaft, for transmitting power from a motor, in a ceiling concealed indoor unit for sending air by rotating the turbofan penetrates a boss of a fan. A distal end of the rotating shaft protrudes from an end surface of the boss, and is screwed with a nut. The fan and the rotating shaft are connected by the nut being screwed with the distal end of the rotating shaft and being fastened through a washer, to realize a structure for transmitting rotation of the motor to the fan.

CITATION LIST

Patent Literature

Patent Literature 1: Japanese Unexamined Patent Application Publication No. 11-62891

SUMMARY OF INVENTION

Technical Problem

However, with the indoor unit of the air-conditioning apparatus disclosed in Patent Literature 1, the indoor unit is installed on a ceiling surface. In the case of coping with malfunction of the indoor unit or of inspecting the indoor unit in this state, an inspection or other maintenance action is performed by removing the fan from the motor. To restore the indoor unit to the original state after an inspection or other maintenance action, the fan has to be attached to the motor by fixation by fastening of the nut, and a worker fastens the nut while facing the ceiling surface. At this time, the worker has to fasten the nut while supporting the fan and holding a small washer against a fastening surface, and the task is difficult and there is a problem in terms of efficiency. Furthermore, the washer is interposed between the nut and a boss end surface of the fan, but the washer is small, and is easily lost at the time of inspection, repair and other maintenance action of the indoor unit.

The present invention has been made to solve the problems described above, and has its object to provide a fan and an indoor unit of an air-conditioning apparatus provided with the fan that are capable of facilitating removal and attachment of the fan and of preventing a washer from being lost.

Solution to Problem

A fan according to an embodiment of the present invention is a fan including a motor, a rotating shaft for transmitting rotation of the motor, and a boss part through which the rotating shaft is inserted at a rotation center, where a distal end portion of the rotating shaft protrudes from the boss part, the distal end portion is inserted through a center hole of a washer, and is screwed with a fastening part, the washer includes a washer bearing surface portion that is fastened by being sandwiched between the fastening part and an end surface of the boss part, and a washer outer peripheral portion surrounding an outer periphery of the washer bearing surface portion, and the washer bearing surface portion and the washer outer peripheral portion are integrated with each other.

Advantageous Effects of Invention

According to the embodiment of the present invention, the washer to be inserted over the rotating shaft and to be interposed between the fastening part and the boss part includes the washer outer peripheral portion, and thus, the washer can be easily held by a worker at the time of removal and attachment of the fan, and the efficiency of work can be increased. Furthermore, the washer may be prevented from being lost during inspection and repair of an indoor unit of an air-conditioning apparatus.

DESCRIPTION OF EMBODIMENTS

Figure 1:
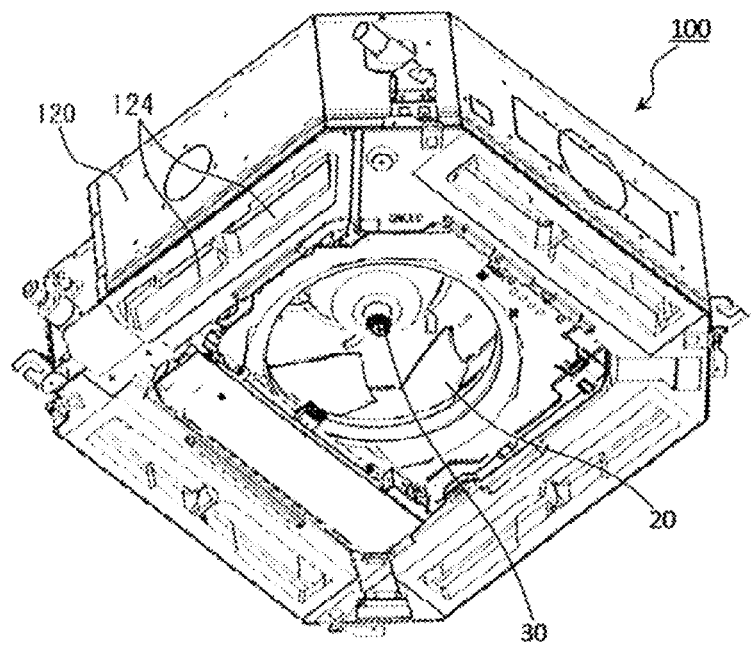
FIG. 1 is a perspective view of an indoor unit of an air-conditioning apparatus according to Embodiment 1 of the present invention.

Hereinafter, an embodiment of the present invention will be described with reference to the drawings. In the drawings, elements denoted with the same reference sign are identical or equivalent elements, and this commonly applies to the entire specification. Moreover, modes of the structural elements in the entire specification are merely examples, and are not interpreted as restrictive. In the drawings, the relationship of sizes of the structural members may be different from actual configuration.

Embodiment 1

Figure 2:
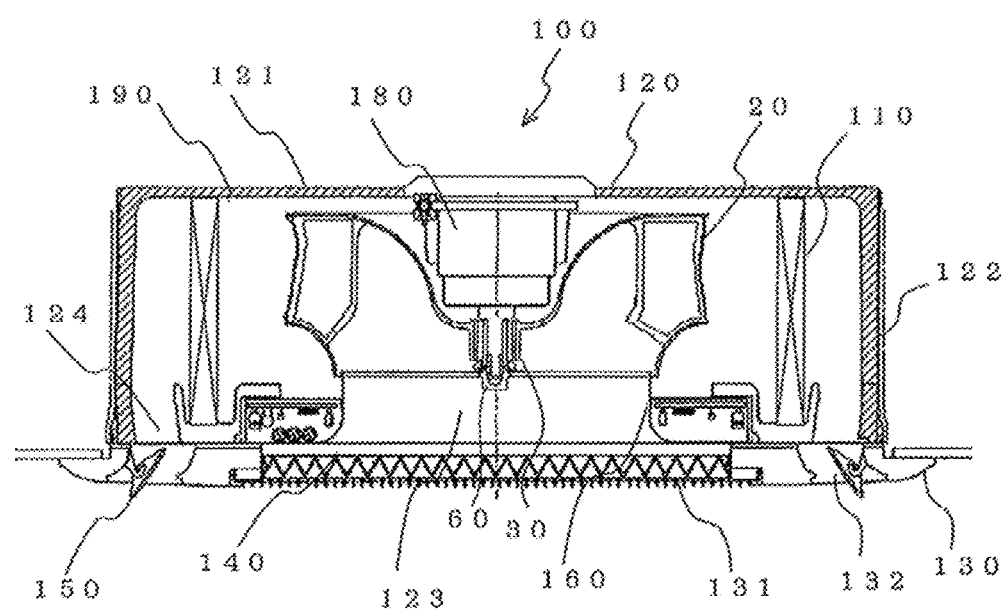
FIG. 2 is a diagram describing a configuration of the indoor unit of the air-conditioning apparatus in FIG. 1.

FIG. 1 is a perspective view of an indoor unit 100 of an air-conditioning apparatus according to Embodiment 1 of the present invention. FIG. 2 is a diagram describing a configuration of the indoor unit 100 of the air-conditioning apparatus in FIG. 1. In Embodiment 1, a description is given of the indoor unit 100 of an air-conditioning apparatus that is a ceiling concealed type, which can be embedded in the ceiling of a room, and that is a four-way cassette type including air outlets 132 on four sides. The indoor unit 100 is connected to an outdoor unit by a refrigerant pipe, and forms a refrigerant circuit for circulating refrigerant to perform refrigeration, air-conditioning and other functions.

As shown in FIG. 1, the indoor unit 100 has a housing 120 formed from a top panel 121 and side panels 122. The indoor unit 100 is embedded and installed in the ceiling of a room with the top panel 121 facing upward. The housing 120 is open on a side (downward side) facing the room. A motor 180 is attached on an inner surface side of the top panel 121. Furthermore, a decorative panel 130 having a substantially square shape in plan view is attached on the downward side of the indoor unit 100, and faces the room. A grille 131 as an air inlet for air (gas) into the indoor unit 100, and a filter 140 for removing dust from air after the air has passed through the grille 131 are provided near a center of the decorative panel 130.

A main body air inlet 123 for rectifying air and causing the air to flow into a main body is provided at a center portion of a lower surface of the indoor unit 100. Furthermore, a main body air outlet 124 for causing air to flow out of the main body is provided around the main body air inlet 123. Moreover, the grille 131, the main body air inlet 123, the main body air outlet 124, and the air outlet 132 are communicated to form an air passage inside the indoor unit 100.

A turbofan 20, a bell mouth 160, the motor 180, an indoor heat exchanger 110, and a heat insulating material 190 are provided inside the main body of the indoor unit 100. The turbofan 20 is an impeller used in a centrifugal fan to which a rotating shaft 50 of the motor 180 is attached. The turbofan 20 is rotated to create a flow of air to send out sideways (left-right directions in FIG. 1) air that is sucked through the grille 131. Details of the turbofan 20 will be given later. Moreover, the bell mouth 160 forms a suction air passage of the turbofan 20, and performs rectification.

The motor 180 is attached to the top panel 121 in such a way that a center portion of the top panel 121 and the rotating shaft 50 are orthogonal to each other. For example, the rotating shaft 50 is vertically oriented. For example, the motor 180 may be attached in contact with the top panel 121, or may be attached to the top panel 121 with a slight gap to the top panel 121. When the motor 180 is driven, the turbofan 20 fixed to the rotating shaft 50 is rotated around the rotating shaft 50.

The indoor heat exchanger 110 is installed surrounding the turbofan 20 on a downstream side of the turbofan 20 with respect to flow of air. For example, when the indoor unit 100 is applied to an air-conditioning apparatus, the indoor heat exchanger 110 functions as an evaporator at the time of cooling operation, and functions as a condenser at the time of heating operation.

On each side of the decorative panel 130, the air outlet 132 for air is formed along each side of the decorative panel 130. The indoor unit 100 of the present embodiment includes four air outlets 132. Each air outlet 132 includes an air outlet vane 150 as a louver for changing an airflow direction. A position of each air outlet vane 150 is controlled by the air outlet vane 150 being rotated around a shaft by driving of a motor (not shown). The heat insulating material 190 as a heat insulating unit is attached to an inner surface of the housing 120 by being stuck to the surface, for example.

Figure 3:
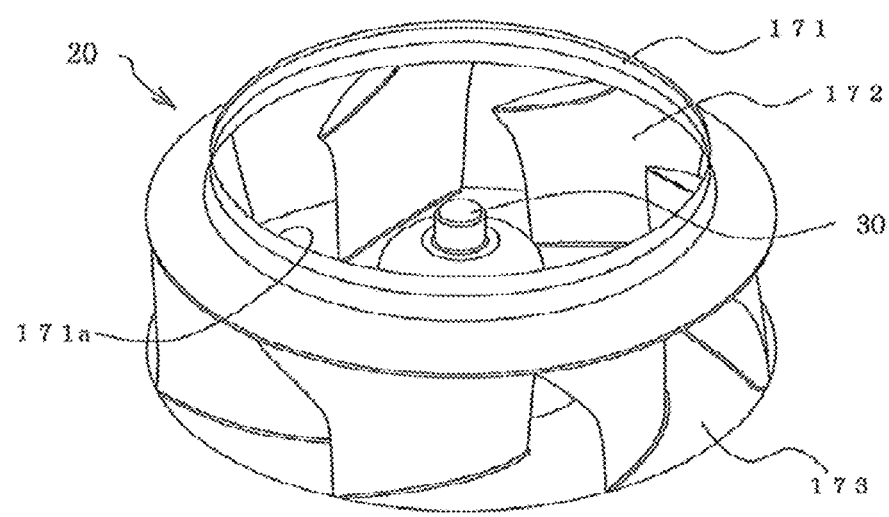
FIG. 3 is a perspective view of a turbofan according to Embodiment 1 of the present invention.
Figure 4:
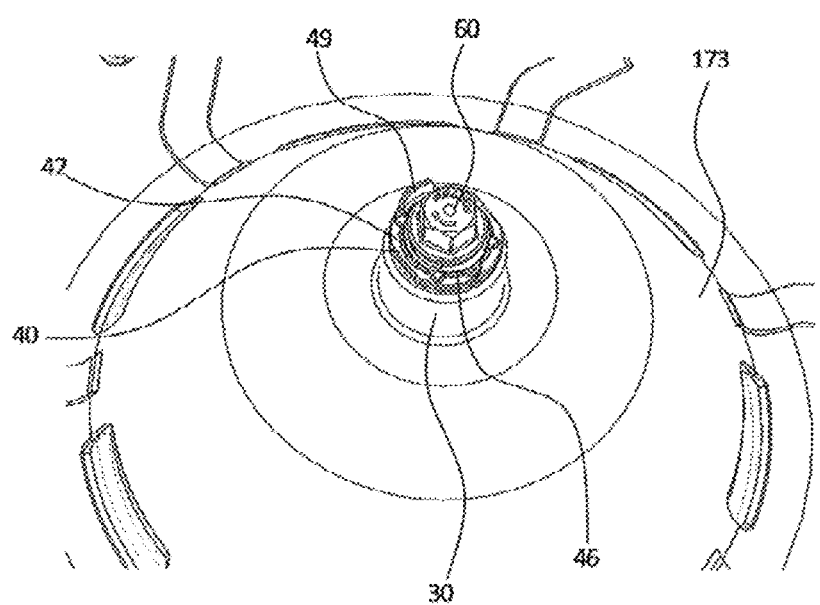
FIG. 4 is an enlarged perspective view of a center portion of the turbofan according to Embodiment 1 of the present invention.

FIG. 3 is a perspective view of the turbofan 20 according to Embodiment 1 of the present invention. FIG. 4 is an enlarged perspective view of a center portion of the turbofan 20 according to Embodiment 1 of the present invention. When the turbofan 20 is rotated, the turbofan 20 sucks in air from a direction of the rotating shaft 50, and blows out the sucked air in an outer peripheral direction intersecting the rotating shaft 50. As shown in FIG. 3, at the turbofan 20 according to Embodiment 1, a shroud 171 and a main plate 173 are disposed facing each other. Moreover, a plurality (seven in FIG. 3) of blades 172 are provided between the shroud 171 and the main plate 173. The shroud 171 is bell mouth shaped, and has an air inlet 171a at a center portion.

The blades 172 create a flow of air from inside the turbofan 20 towards the outer peripheral direction. The blades 172 of the present embodiment are each a three-dimensional blade having a twisted shape between the shroud 171 and the main plate 173. Because the blade 172 is a three-dimensional blade, noise and power consumption may be reduced, for example.

The main plate 173 is a base of the turbofan 20 where the blades 172 are joined, for example. A center portion of the main plate 173 protrudes towards an inside of the turbofan 20. Accordingly, an outer surface side of the main plate 173 is recessed at the center portion, and the motor 180 is accommodated inside a recessed space. Therefore, the main plate 173 covers the motor 180.

Figure 5:
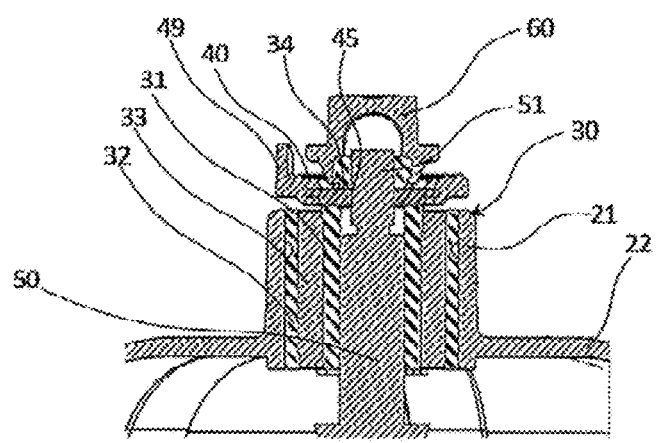
FIG. 5 is a diagram describing a structure of a cross section of the turbofan according to Embodiment 1 of the present invention.

FIG. 5 is a diagram describing a structure of a cross section of the turbofan 20 according to Embodiment 1 of the present invention. At a center of a part 22 formed protruding from the center portion of the main plate 173, a boss part 30 is formed protruding from a surface. The boss part 30 includes, at a center, a sleeve 31 through which the rotating shaft 50 penetrates, and includes a cylindrical boss 32 on an outer peripheral side of the sleeve 31. An anti-vibration rubber 33 is interposed between an outer peripheral surface of the sleeve 31 and an inner peripheral surface of the boss 32. The anti-vibration rubber 33 adheres to the outer peripheral surface of the sleeve 31 and the inner peripheral surface of the boss 32.

An outer peripheral surface of the boss 32 is covered by a material forming the main plate 173 of the turbofan 20. The sleeve 31, the boss 32, and the anti-vibration rubber 33 are integrated with the main plate 173.

The rotating shaft 50 is inserted through the sleeve 31 of the boss part 30. A distal end portion 51 of the rotating shaft 50 protrudes from an end surface 34 of the boss part 30. The distal end portion 51 is further inserted through a center hole 45 of a washer 40, and a fastening part 60 is screwed with a part protruding from the washer 40. The washer 40 is sandwiched between the end surface 34 of the boss part 30 and the fastening part 60 to be a bearing surface for the fastening part 60, and functions as a washer for preventing loosening of the fastening part 60.

Figure 6:
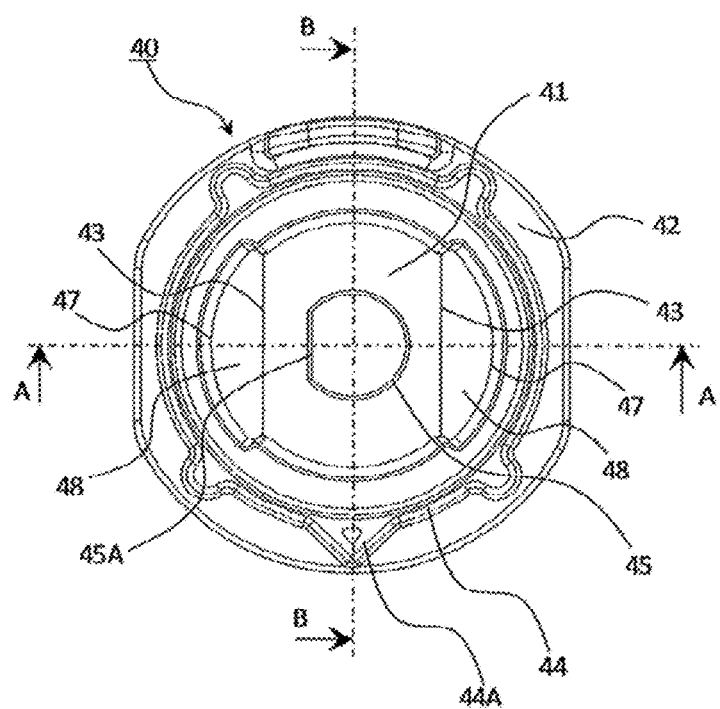
FIG. 6 is a diagram showing a washer in FIG. 5 along an axial direction of a rotating shaft.
Figure 7:
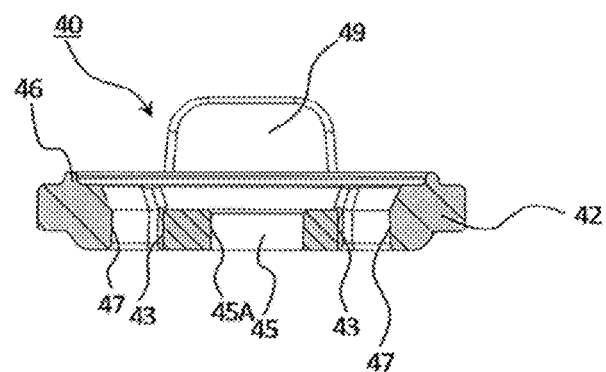
FIG. 7 is a diagram showing a cross section taken along A-A in FIG. 6.
Figure 8:
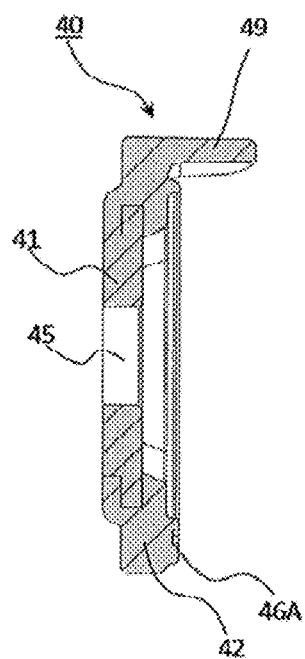
FIG. 8 is a diagram showing a cross section taken along B-B in FIG. 6.

FIG. 6 is a diagram showing the washer 40 in FIG. 5 along an axial direction of the rotating shaft 50. FIG. 7 is a diagram showing a cross section taken along A-A in FIG. 6. FIG. 8 is a diagram showing a cross section taken along B-B in FIG. 6. The washer 40 includes a washer bearing surface portion 41 at a center, and includes a washer outer peripheral portion 42 surrounding the washer bearing surface portion 41. As shown in FIG. 5, the washer bearing surface portion 41 is a part that is sandwiched between the fastening part 60 and the end surface 34 of the boss part 30, and that is made the bearing surface by coming into contact with the fastening part 60. The washer bearing surface portion 41 is formed of a flat plate-shaped metal, such as stainless steel, obtained by stamping, for example. The center hole 45 is opened at a center portion of the washer bearing surface portion 41. A D-cut portion 45A, which is a circle whose arc is partially cut by a straight line, is formed at the center hole 45. Like the center hole 45, a cross section of the distal end portion 51 also has a shape that is a circle whose arc is partially cut by a straight line, and the distal end portion 51 of the rotating shaft 50 fits in the center hole 45 when the distal end portion 51 penetrates the center hole 45. According to such a configuration, the washer 40 does not rotate relative to the rotating shaft 50.

Of an outer peripheral end surface of the flat plate-shaped material of the washer bearing surface portion 41, two outer peripheral end surfaces 43 that face each other are exposed. An outer peripheral surface other than the outer peripheral end surfaces 43 is covered by a material forming the washer outer peripheral portion 42. The washer outer peripheral portion 42 is formed to surround the washer bearing surface portion 41. The washer outer peripheral portion 42 includes inner peripheral arc portions 47 facing the outer peripheral end surfaces 43. Parts surrounded by the outer peripheral end surfaces 43 and the inner peripheral arc portions 47 are made into opening ports 48. The opening ports 48 are symmetrically arranged with respect to a center of the washer 40.

Figure 9:
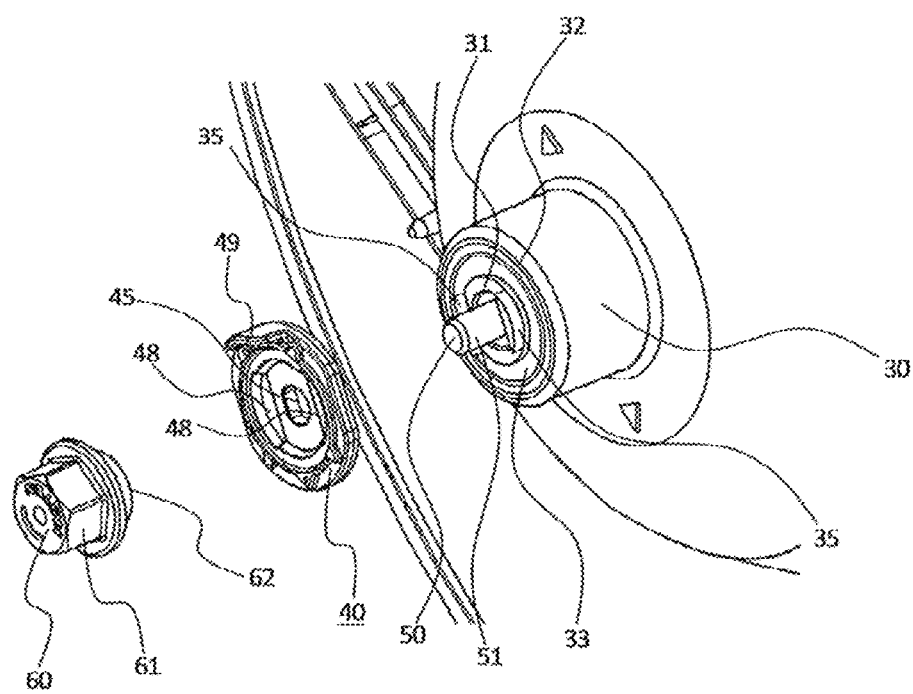
FIG. 9 is a perspective view describing a structure of a boss part of the turbofan according to Embodiment 1 of the present invention.

FIG. 9 is a perspective view describing a structure of the boss part 30 of the turbofan 20 according to Embodiment 1 of the present invention. Two fitting portions 35 protruding at symmetrical positions with respect to a center of the turbofan 20 are provided on the end surface of the boss part 30 of the turbofan 20. Fitting surfaces 35A of the fitting portions 35 face each other across a center axis of the turbofan 20. When the washer 40 is placed on the end surface of the boss part 30, the fitting portions 35 are inserted into the opening ports 48 of the washer 40. The two outer peripheral end surfaces 43 of the washer bearing surface portion 41 come into contact with the two fitting surfaces 35A of the fitting portions 35, and the washer 40 and the boss part 30 are prevented from rotating relative to each other.

The rotating shaft 50 and the washer 40 are fitted together at the center hole 45 of the washer 40 in such a way that relative rotation is not performed, and the washer 40 and the boss part 30 are fitted together by the outer peripheral end surfaces 43 of the washer bearing surface portion 41 and the fitting portions 35 in such a way that relative rotation is not performed. That is, three components of the rotating shaft 50, the washer 40, and the turbofan 20 are fitted together in such a way that relative rotation is not performed, and a rotational driving force of the motor 180 is transmitted from the rotating shaft 50 to the turbofan 20 through the washer 40.

As shown in FIG. 5, the washer 40 is fixed in a sandwiched state to the end surface of the boss part 30 by the fastening part 60 screwed with the distal end portion 51 of the rotating shaft 50. The washer 40 is prevented by the fastening part 60 from moving in an axial direction of the rotating shaft 50, and thus, a fitted state of the outer peripheral end surfaces 43 of the washer bearing surface portion 41 and the fitting portions 35 is maintained.

As shown in FIGS. 5 and 9, the washer 40 includes a protruding portion 49 extending in the axial direction of the rotating shaft 50. The protruding portion 49 protrudes from an edge of the washer outer peripheral portion 42, and does not cause interference when the fastening part 60 is screwed with the distal end portion 51 of the rotating shaft 50. Furthermore, the protruding portion 49 is provided only at one position on the washer outer peripheral portion 42, and identification of a rotation direction, and of front and back of the washer 40 is thereby enabled.

Figure 10:
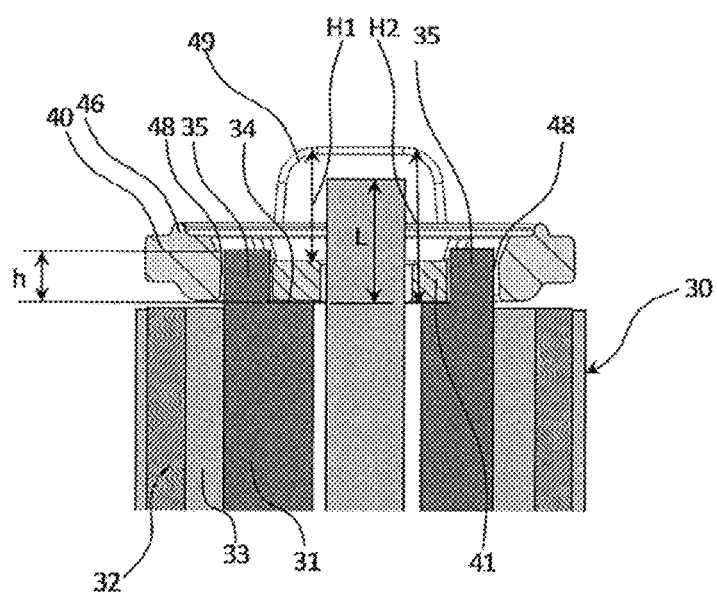
FIG. 10 is a diagram showing a state where the washer according to Embodiment 1 of the present invention is placed on an end surface of the boss part.

FIG. 10 is a diagram showing a state where the washer 40 according to Embodiment 1 of the present invention is placed on the end surface of the boss part 30. When the washer 40 is disposed on the end surface of the boss part 30 in a normal state, the fitting portions 35 are inserted in the opening ports 48 of the washer 40. However, in FIG. 10, if the washer 40 is assembled upside down, the protruding portion 49 contacts the end surface 34 of the boss part 30. A height H1 of the protruding portion 49 from the washer bearing surface portion 41 is greater than a height h of the fitting portion 35 from the end surface 34 of the boss part 30. Accordingly, when the washer 40 is assembled upside down to the boss part 30, the opening ports 48 of the washer 40 and the fitting portions 35 are not fitted together. Furthermore, a total height H2 of the washer 40, or in other words, a height from a surface, of the washer bearing surface portion 41, on the side of the boss part 30 to the protruding portion 49 is equal to or greater than a protruding amount L of the distal end portion 51 of the rotating shaft 50 from the end surface 34 of the boss part 30. According to such a configuration, even if the washer 40 is assembled upside down to the end surface 34 of the boss part 30, the fastening part 60 is not screwed with the distal end portion 51 of the rotating shaft 50, and the washer 40 may be prevented from being assembled upside down.

Furthermore, because the washer 40 includes the protruding portion 49, there is an advantage that a worker can easily hold the washer 40 at the time of attaching the turbofan 20 to the indoor unit 100. Moreover, because an outer shape of the washer 40 is greater than an outer shape of the fastening part 60, the washer 40 can be held by the worker without causing interference to the task of fastening the fastening part 60.

As shown in FIG. 5, an outer shape of the washer outer peripheral portion 42 is greater than an outer shape of the boss 32 of the boss part 30. That is, when seen along the axial direction of the rotating shaft 50, the boss 32 is hidden by the outer shape of the washer outer peripheral portion 42. Accordingly, even in a case where the boss 32 is made of metal, the boss 32 is prevented by the washer outer peripheral portion 42 made of an insulating material from being exposed to a surface that can be touched by a user.

As shown in FIGS. 5 and 9, the fastening part 60 is a nut part that is open at one end portion, and that includes a thread portion inside the opening. A part of the fastening part 60 that is exposed at least in a state where the fastening part 60 is fastened to the distal end portion 51 of the rotating shaft 50 is made of an insulating material. For example, the fastening part 60 is a part that covers an outside of a metal nut by an insulating material, and that is integrated with the metal nut.

According to such a configuration, even if the washer bearing surface portion 41, the sleeve 31, and the boss 32 are made of a conductive material, the conductive material is not exposed at a part that can be touched by a user in a state where the turbofan 20 is attached to the indoor unit 100, and there is an advantage that the safety is increased. Furthermore, metal at a contact surface 62, of the fastening part 60, that comes into contact with the washer bearing surface portion 41 is exposed. Accordingly, the washer bearing surface portion 41 and the contact surface 62 are in contact with each other through metal, and axial force of fastening can be increased, and the fastening part 60 may be prevented from loosening. In this manner, the fastening part 60 is configured in such a way that the safety is increased while loosening is prevented.

The washer outer peripheral portion 42 includes a rib 46 protruding in the axial direction of the rotating shaft 50. The rib 46 is provided on an entire circumference of the washer outer peripheral portion 42, along an outer shape of the washer outer peripheral portion 42. Furthermore, the rib 46 is provided at a position where the rib 46 does not interfere with the fastening part 60 in a state where the fastening part 60 is fastened to the distal end portion 51 of the rotating shaft 50. The rib 46 is provided to cover a gap formed between the fastening part 60 and the washer outer peripheral portion 42, and preferably, the rib 46 is provided along the outer shape of the fastening part 60 when seen along the axial direction of the rotating shaft 50. Moreover, a height of the rib 46 is preferably greater than the gap between the fastening part 60 and the washer outer peripheral portion 42. According to such a configuration, in a state where the turbofan 20 is attached to the indoor unit 100, a distance from the washer bearing surface portion 41, made of a conductive material, to the surface that can be touched by a user can be increased, and the safety can be increased.

As shown in FIG. 9, the fastening part 60 includes a grip portion 61 to be gripped by a tool or other implement used to fasten the fastening part 60 to the boss part 30. The grip portion 61 is formed on a distal end side of the fastening part 60 along the axial direction of the rotating shaft 50. Moreover, the grip portion 61 is formed protruding in the axial direction of the rotating shaft 50 than the protruding portion 49 of the washer 40. Accordingly, the grip portion 61 can be gripped by a tool or other implement without interference from the protruding portion 49, and thus, fastening of the fastening part 60 is facilitated.

Effects of Embodiment 1

(1) The turbofan 20 according to Embodiment 1 is the turbofan 20 including the motor 180, the rotating shaft 50 for transmitting rotation of the motor 180, and the boss part 30 through which the rotating shaft 50 is inserted at a rotation center, where the distal end portion 51 of the rotating shaft 50 protrudes from the boss part 30, the distal end portion 51 is inserted through the center hole 45 of the washer 40, and is screwed with the fastening part 60, the washer 40 includes the washer bearing surface portion 41 that is fastened by being sandwiched between the fastening part 60 and the end surface 34 of the boss part 30, and the washer outer peripheral portion 42 surrounding an outer periphery of the washer bearing surface portion 41, and the washer bearing surface portion 41 and the washer outer peripheral portion 42 are integrated with. Additionally, the turbofan 20 according to Embodiment 1 corresponds to a fan of the present invention. In Embodiment 1, a description is given, by citing the indoor unit 100 of a ceiling concealed air-conditioning apparatus as an example, of a structure attaching the boss part 30 of a fan to the motor 180, but application to other devices including a fan, such as an outdoor unit, is also possible without being limited to application to the indoor unit 100 of an air-conditioning apparatus.

According to such a configuration, a task of attaching the turbofan 20 to the rotating shaft 50 can be performed while holding the washer outer peripheral portion 42, and the efficiency of attachment and removal of the turbofan 20 can be increased. Furthermore, the washer 40 may be prevented from being lost during inspection of the indoor unit 100 or other maintenance action of the air-conditioning apparatus.

(2) With the turbofan 20 according to Embodiment 1, the washer bearing surface portion 41 includes the center hole 45 through which the distal end portion 51 of the rotating shaft 50 is inserted, and the two outer peripheral end surfaces 43 facing each other. The distal end portion 51 and the center hole 45 are fitted together, the fitting portions 35 protrude from the boss part 30, on a side where the distal end portion 51 of the rotating shaft 50 protrudes, and the fitting portions 35 fit with the outer peripheral end surfaces 43 of the washer bearing surface portion 41.

(3) With the turbofan 20 according to Embodiment 1, the washer bearing surface portion 41 includes the center hole 45 through which the distal end portion 51 of the rotating shaft 50 is inserted, and the two outer peripheral end surfaces 43 facing each other. The washer 40 includes the two opening ports 48 at symmetrical positions with respect to the center hole 45, and the opening ports 48 are formed by the outer peripheral end surfaces 43 of the washer bearing surface portion 41 and an inner peripheral surface of the washer outer peripheral portion 42.

According to such a configuration, in addition to achieving the effect described in (1), the turbofan 20 may achieve a structure where a rotational driving force of the motor 180 is transmitted to the turbofan 20, by the turbofan 20 and the washer 40 being fitted together and the washer 40 and the rotating shaft 50 being fitted together as in a conventional case.

(4) With the turbofan 20 according to Embodiment 1, the washer outer peripheral portion 42 is connected to the washer bearing surface portion 41, at an outer peripheral portion of the washer bearing surface portion 41 excluding the outer peripheral end surfaces 43.

According to such a configuration, power of the motor 180 is not transmitted to the washer outer peripheral portion 42. Accordingly, a rotational driving force of the rotating shaft 50 may be transmitted to the turbofan 20 while increasing the efficiency of attachment and removal of the turbofan 20, as described in (1) to (3) above.

(5) With the turbofan 20 according to Embodiment 1, the washer outer peripheral portion 42 includes the protruding portion 49 protruding in the axial direction of the rotating shaft 50.

According to such a configuration, front and back of the washer 40 can be easily distinguished, and erroneous attachment at the time of attachment/removal of the turbofan 20 may be prevented. Furthermore, providing the protruding portion 49 enables a worker to easily hold the washer 40, and thus, work efficiency is increased.

(6) With the turbofan 20 according to Embodiment 1, a height of the protruding portion 49 from the washer bearing surface portion 41 is greater than a height from the end surface of the boss part 30 to distal ends of the fitting portions 35.

According to such a configuration, even if the washer 40 is attached upside down to the boss part 30, the fitting portions 35 and the opening ports 48 are not fitted together, and erroneous assembling can be prevented.

(7) With the turbofan 20 according to Embodiment 1, the fastening part 60 includes the contact surface 62 that contacts the washer bearing surface portion 41, and the grip portion 61 to be gripped at a time of fastening. The grip portion 61 is formed protruding more than the protruding portion 49 in the axial direction of the rotating shaft 50.

According to such a configuration, even when the washer 40 includes the protruding portion 49 on the side of the fastening part 60, work is not obstructed at the time of gripping and fastening the fastening part 60 by a tool or other implement.

(8) With the turbofan 20 according to Embodiment 1, the washer outer peripheral portion 42 includes the rib 46 extending in the axial direction of the rotating shaft 50. The rib 46 is provided on an entire circumference along an outer periphery of the washer outer peripheral portion 42.

(9) With the turbofan 20 according to Embodiment 1, the boss part 30 includes the sleeve 31 through which the rotating shaft 50 is inserted, the cylindrical boss 32 positioned outside the sleeve 31, and the anti-vibration rubber 33 interposed between the outer peripheral surface of the sleeve 31 and the inner peripheral surface of the boss 32. The washer outer peripheral portion 42 has a greater outer shape than the end surface of the boss 32.

(10) With the turbofan 20 according to Embodiment 1, the washer bearing surface portion 41 is made of flat plate-shaped metal, and the washer outer peripheral portion 42 is made of an insulating material.

According to such a configuration, a distance may be secured between a surface that can be touched by a worker or a user and a metal part such as the washer bearing surface portion 41, and safety is increased.

(11) The indoor unit 100 of an air-conditioning apparatus according to Embodiment 1 includes the turbofan 20 described in any of (1) to (10) above.

According to such a configuration, even in the case of attaching/removing the turbofan 20 while facing the ceiling, as in the case of the indoor unit 100 of a ceiling concealed air-conditioning apparatus, for example, efficiency of work can be increased, and safety can also be increased.

REFERENCE SIGNS LIST 20 turbofan 22 part 30 boss part 31 sleeve 32 boss 33 anti-vibration rubber 34 end surface 35 fitting portion 35A fitting surface
40 washer 41 washer bearing surface portion 42 washer outer peripheral portion 43 outer peripheral end surface 45 center hole 45A D-cut portion 46 rib 47 inner peripheral arc portion 48 opening port 49 protruding portion 50 rotating shaft 51 distal end portion 60 fastening part 61 grip portion 62 contact surface 100 indoor unit 110 indoor heat exchanger 120 housing 121 top panel 122 side panel 123 main body air inlet 124 main body air outlet 130 decorative panel 131 grille 132 air outlet 140 filter 150 air outlet vane 160 bell mouth
171 shroud 171a air inlet 172 blade 173 main plate 180 motor 190 heat insulating material H1 height H2 total height L protruding amount h height

The invention claimed is:

1. A fan comprising:
a motor;
a rotating shaft configured to transmit rotation of the motor; and
a boss part through which the rotating shaft is inserted at a rotation center, wherein
a distal end portion of the rotating shaft protrudes from the boss part,
the distal end portion is inserted through a center hole of a washer, and is screwed with a fastening part,
the washer includes
a washer bearing surface portion that is fastened by being sandwiched between the fastening part and an end surface of the boss part, and
a washer outer peripheral portion surrounding an outer periphery of the washer bearing surface portion, and
the washer bearing surface portion includes
the center hole through which the distal end portion of the rotating shaft is inserted, and
two outer peripheral end surfaces facing each other, and
the washer bearing surface portion is made of flat plate-shaped metal,
the washer outer peripheral portion is made of an insulating material,
the washer bearing surface portion and the washer outer peripheral portion are integrated with each other, and
of the boss part,
fitting portions protrude from the boss part, on a side where the distal end portion of the rotating shaft protrudes, and
the fitting portions fit with the outer peripheral end surfaces of the washer bearing surface portion.

2. The fan of claim 1, wherein
the washer includes two opening ports at symmetrical positions with respect to the center hole, and
the opening ports are formed by the outer peripheral end surfaces of the washer bearing surface portion and an inner peripheral surface of the washer outer peripheral portion.

3. The fan of claim 1, wherein the washer outer peripheral portion is connected to the washer bearing surface portion, at an outer peripheral portion of the washer bearing surface portion excluding the outer peripheral end surfaces.

4. The fan of claim 1, wherein the washer outer peripheral portion includes a protruding portion protruding in an axial direction of the rotating shaft.

5. The fan of claim 4, wherein
a height of the protruding portion from the washer bearing surface portion is greater than a height from the end surface of the boss part to distal ends of the fitting portions.

6. The fan of claim 4, wherein
the fastening part includes
a contact surface that contacts the washer bearing surface portion, and
a grip portion to be gripped at a time of fastening, and
the grip portion is formed protruding more than the protruding portion in the axial direction of the rotating shaft.

7. The fan of claim 1, wherein
the washer outer peripheral portion includes a rib extending in an axial direction of the rotating shaft, and
the rib is provided on an entire circumference along an outer periphery of the washer outer peripheral portion.

8. The fan of claim 1, wherein
the boss part includes
- a sleeve through which the rotating shaft is inserted,
- a cylindrical boss positioned outside the sleeve, and
- an anti-vibration rubber interposed between an outer peripheral surface of the sleeve and an inner peripheral surface of the boss, and the washer outer peripheral portion has a greater outer shape than an end surface of the boss.

9. An indoor unit of an air-conditioning apparatus, the indoor unit comprising a fan of any one of claim 1.

* * * * *